United States Patent [19]

Tarancon

[11] Patent Number: 5,242,661
[45] Date of Patent: Sep. 7, 1993

[54] APPARATUS FOR DIRECT FLUORINATION OF POLYMERIC RESINS

[75] Inventor: Gregorio Tarancon, Woodbridge, N.J.

[73] Assignee: Liquid Carbonic, Inc., Ontario, Canada

[21] Appl. No.: 779,369

[22] Filed: Oct. 17, 1991

Related U.S. Application Data

[63] Continuation-in-part of Ser. No. 545,277, Jun. 28, 1990, Pat. No. 5,149,744.

[51] Int. Cl.$^5$ .................. C08F 2/00; F28D 21/00; B01J 8/08; G01F 11/10
[52] U.S. Cl. ......................... 422/131; 422/134; 422/138; 422/202; 422/213; 222/368; 222/425; 222/450
[58] Field of Search ............ 422/131, 134, 138, 140, 422/202, 204, 213; 222/368, 425, 447, 450

[56] References Cited

U.S. PATENT DOCUMENTS

| | | |
|---|---|---|
| 2,811,468 | 10/1957 | Joffre . |
| 2,825,721 | 3/1958 | Hogan et al. . |
| 3,012,024 | 12/1961 | Kavesh . |
| 3,630,686 | 12/1971 | Rothert . |
| 3,679,368 | 7/1972 | Balint et al. .................. 422/134 |
| 3,934,937 | 1/1976 | Tee et al. . |
| 4,060,183 | 11/1977 | Puurunen . |
| 4,536,266 | 8/1985 | Bliefert et al. . |
| 4,703,094 | 10/1987 | Raufaust .................. 526/65 |
| 4,897,245 | 1/1990 | Hsia et al. .................. 422/131 |
| 5,034,195 | 7/1991 | Platz .................. 422/134 |

FOREIGN PATENT DOCUMENTS 0059905 4/1982 Japan .................. 422/131

OTHER PUBLICATIONS

Pierce et al, "New and Varied Paths for Fluorine Chemistry", *Chemical and Engineering News*, pp. 72-80, Jul. 9, 1962, Washington D.C.

Margrave et al, "Fluorine Compounds, Organic", *Encyclopedia of Chemical Technology*, vol. 10, 3rd ed. pp. 840-855, New York.

*The Polymer Letters Edition*, "The Controlled Reaction of Hydrocarbon Polymers with Elemental Fluorine", 1974, pp. 177-189.

Clark et al, "Applications of ESCA to Polymer Chemistry. Part VI. Surface Flourination of Polyethylene, Application of ESCA to the Examination of Structure as a Function of Depth", *Journal of Polymer Science* vol. 13, 1975, pp. 857-889.

*Primary Examiner*—Robert J. Warden
*Assistant Examiner*—Christopher Y. Kim
*Attorney, Agent, or Firm*—Neil F. Markva

[57] ABSTRACT

An apparatus for the direct fluorination of solid particles of polymeric resins capable of being fluorinated in which the solid particles are contacted by a flow of a mixture of fluorine and carrier fluid in a solid-gas reactor. In the solid-gas reactor, the fluid flow continuously agitates or fluidizes the solid particles to maintain the solid particles in motion. The degree of motion of the solid particles is a function of the linear velocity of the fluid and of the physical properties of the solid particles such as the solid bulk density, particle size, geometry of the solid particle, and adhesion or agglomeration of solid particles. The solid-gas reactor can be arranged with single or multi-reactors in batch or continous mode.

10 Claims, 6 Drawing Sheets

APPARATUS FOR DIRECT FLUORINATION OF POLYMERIC RESINS

BACKGROUND OF THE INVENTION

This application is a continuation-in-part of application Ser. No. 07/545,277 filed Jun. 28, 1990, now U.S. Pat. No. 5,149,744 issued Sep. 22, 1992.

This invention relates to the direct fluorination of polymeric resins and, more particularly, relates to apparatus for the direct fluorination of polymeric resins in particulate form which are capable of being fluorinated by contact with elemental fluorine and a carrier fluid.

FIELD OF THE INVENTION

The fluorination of polymers to enhance lubricity, nonflammability and chemical inertness, such as resistance to oxidation, and to reduce permeability by organic solvents, particularly non polar solvents, by the replacement of hydrogen by fluorine by the use of fluorine itself or by the use of a metal fluoride is well known.

The July, 1962 publication of Chemical & Engineering News discusses in the article "New and Varied Paths for Fluorine Chemistry" the chemical reactions which occur when fluorine reacts with organic molecules. The Encyclopedia of Chemical Technology, Third Edition, (Volume 10) published by John Wiley & Sons discusses direct fluorination of organic compounds to produce fluorocarbon polymers by the direct reaction of fluorine with polyethylene.

The Polymer Letters Edition, Volume 12, (1974), contains the article "The Controlled Reaction of Hydrocarbon Polymers with Elemental Fluorine" which discloses the reaction of polyethylene and other finely powdered hydrocarbon polymers with fluorine.

The Journal of Polymer Science, Volume 13, pp 857-890, (1975), discloses in "Part VI Surface Fluorination of Polyethylene" the surface coating of polyethylene by replacement of hydrogen by fluorine.

U.S. Pat. No. 2,811,468 issued Oct. 29, 1957 discloses the fluorination of a surface of polyethylene film to render the surface substantially impermeable.

Fluorination of polymeric resins is usually carried out with carriers in the gas phase or in the liquid phase. In the liquid fluorination phase the temperature of operation is generally lower than room temperature and the fluorine concentration is lower than 2 mole percent. In the gas phase fluorination, the temperature of operation is above the room temperature and the fluorine concentration generally is higher than 2 mole percent.

Gaseous carrier fluids essentially are ideal gases with low heat capacity per unit of volume, low polarizability or ability to induce dipole moment, and low critical temperature as well as a cryogenic boiling point. When fluorine reacts with solid particles of polymeric resin, such as polyolefin resins including polyethylene, hydrogen in the polymer molecule combines with fluorine atoms to form hydrogen fluoride. The reaction is exothermic and, in order to prevent deterioration of the resin during fluorination due to local overheating, generated heat must be dissipated.

The carrier fluids used in the prior art (e.g., $N_2$, Ar, He) are gases that have a low-solubility capacity for the byproduct hydrogen fluoride which is produced because of their polarizability, low critical temperature, low density, and low heat capacity, which reduces their ability for heat transfer in both directions.

U.S. Pat. No. 4,536,266 issued Aug. 20, 1985 teaches a process for the fluorination of surface layers of articles by exposure of the surface layer to a fluorine-yielding liquid solvent or solvent mixture in a controllable reaction by controlled introduction of fluorine gas in order to overcome problems considered inherent with the use of gaseous carrier fluids.

It is a principal object of the present invention to provide an apparatus for the fluorination of polymeric resins quickly, consistently and safely by the use of elemental fluorine in a vapour phase with a carrier fluid which effectively functions as a heat sink to maintain a constant reaction temperature to control the aggressiveness of the elemental fluorine during the reaction with polymeric resin particles and to provide uniform treatment of the resins by maintaining continous contact between the particles and the carrier fluid.

It is another object of the invention to provide an apparatus for batch or continuous fluorination of particulate polymeric resins in which operating parameters can be closely controlled to prevent agglomeration of the particles by continuously fluidizing or agitating the resin particles to maintain the particles in a state of fluidity.

SUMMARY OF THE INVENTION

In its broad aspect, the apparatus of the present invention for fluorinating polymeric materials comprises a closed reactor having a reaction zone with a lower end and an upper end, means for feeding a particulate polymeric material capable of being fluorinated to said reactor reaction zone at the upper end thereof, means for feeding a mixture of flourine and a carrier fluid to said reactor reaction zone at the lower end thereof for agitating or fluidizing the particulate polymeric material and for reaction with the said polymeric material, means for controllably removing fluids from said reactor, and means for controllably discharging fluorinated polymeric material from said reactor.

The reactor preferably is cylindrical, the lower end of the reactor has a height to diameter ratio in the range of 1.5:1 to 5:1, and the upper end of the reactor has a height to diameter ratio in the range of 1:1 to 2:1. The lower end of said reactor preferably is jacketed with a heat exchanger for controlling the temperature within the reactor.

A plurality of said reactors may be arranged in parallel wherein manifold means selectively introduce a mixture of fluorine and carrier fluid to the lower end of at least one reactor and manifold means controllably remove fluids from said at least one reactor for a continuous operation.

The carrier fluid is selected from the group consisting of helium, nitrogen, argon and a dense carrier fluid having a critical temperature higher than ambient temperature, a boiling point lower than ambient temperature minus 60 celcius degrees, and a molecular weight greater than the molecular weight of elemental fluorine.

The dense carrier fluids of the present invention are neither gases nor liquids but function, under the conditions of the process of the invention, as vapours, which are dense compared to ideal gases but sufficiently remote from the dew point not to be classified as liquids.

Dense carrier fluids of the invention are vapours with molecular weights greater than the molecular weight of fluorine, critical temperatures higher than ambient temperature, i.e. room temperature, and a boiling point lower than room temperature minus 60 celcius degrees. Ambient or room temperature is defined to be about 24° C. In that the dense carrier fluid of the invention has a critical temperature higher than room temperature and a boiling point lower than room temperature minus 60 celcius degrees, a vaporous condition outside of the dew point is established in the temperature range of the process of a maximum of 60 celcius degrees above room temperature and a minimum of 60 celcius degrees below room temperature, i.e. about −36° C. to about 84° C. (237° K. to about 357° K.).

The dense carrier fluid has a molecular weight in the range of from about 40 to 200, preferably about 44 to 188, which is greater than the molecular weight of fluorine, to provide a carrier fluid having a density greater than the density of fluorine.

It is important in the selection of the dense carrier fluid to consider the degree of reactivity of the dense carrier fluid with fluorine as a function of the fluorine partial pressure and the operating temperature range during the time the dense carrier fluid is in contact with the fluorine gas. The selection of dense carrier fluid thus is based on its reactiveness with fluorine at the operating temperature and fluorine concentration while being compatible with the fluorine.

The dense carrier fluids have advantages compared with liquids and ideal gases. Liquids are difficult to totally remove from the reactor and represent hazardous environmental problem. The dense fluids approach the heat capacity of the liquids but can be extracted from the reactor in the same way as ideal gases which have a low heat capacity that permits easy elevation of the temperature in the reactor.

Liquid fluids have the critical temperature higher than the room temperature and the boiling point higher than the room temperature minus 60 celcius degrees. Gas fluids (ideal gases) have the critical temperature lower than the room temperature minus 60 celcius degrees and the boiling point lower than the room temperature minus 60 celcius degrees, as shown in Table 1.

TABLE 1

| TYPE OF FLUID | CRITICAL TEMPERATURE | BOILING POINT |
|---|---|---|
| Liquid fluids | >RT | >RT-60° C. |
| Dense fluids | >RT | <RT-60° C. |
| Ideal gases | <RT | <RT-60° C. |

Turning now to Table 2, the vapor phase carrier fluid is shown to provide the optimum combination with respect to reactivity, heat capacity, density and handling compared to gas phase and liquid phase carrier fluids. Vapor carrier fluids having a molecular weight of 40 to 200 have a range of density of 1.8 to 9 g/l and a range of heat capacity of 9 cal/mole °C. to 45 cal/mole °C.

TABLE 2

| Physical state | Carrier Fluid | | | Heat capacity | Fluorine reactivity |
|---|---|---|---|---|---|
| | Fluid | Boiling point | Density | | |
| gas phase | N2 | −195° C. | 1.25 g/l | 7 cal/mole °C. | N |
| Vapour | SF6 | −50° C. | 6.50 g/l | 24 cal/mole °C. | N |
| Liquid | CBr2F2 | +25° C. | 2.45 Kg/l | 32 cal/mole °C. | Y |

Dense carrier fluids which meet the above criteria and are suited for the process of the invention are typified by perfluoropropane, chloropentafluoroethane, sulphurtetrafluoride, sulphur hexafluoride, tetrafluoroethylene, hexafluorothane, carbon dioxide, chlorotrifluoromethane, bromotrifluoromethane, and trifluoromethane.

Carbon dioxide ($CO_2$), for example, is a vapor at 300° K., is triatomic with different kinds of elements, and is a polarizable molecule, as opposed to the carrier fluids used in the prior art, which are diatomic or monotomic and have only one element. The density of $CO_2$ within the temperature range of the fluorination process of polyethylene (300° K. to 400° K.) is very high in comparison to the density of $N_2$ in the same range. The heat contained in $CO_2$ per unit of volume is double the amount contained in $N_2$ per unit of volume. HF is far more soluble in $CO_2$ than in $N_2$, guaranteeing a more complete fluorination reaction.

Because the critical temperature of $CO_2$ is 31° C., it can be stored at room temperature in regular tank containers. The carrier fluids in the prior art required cryogenic tanks with very sensitive temperature release valves to protect the container from excessive pressure.

The partial pressure of fluorine during the process of the invention is in the range of about 12 to about 120 torr and the total pressure is in the range of about 12 to 12,000 torr, preferably about 25 to about 2500 torr. The fluorine concentration in the carrier fluid is in the range of about 2 to about 15% by volume, preferably about 3 to about 12% by volume.

BRIEF DESCRIPTION OF THE DRAWINGS

The apparatus of the invention will now be described with reference to the accompanying drawings, in which.

DESCRIPTION OF THE PREFERRED EMBODIMENT

Figure 1:
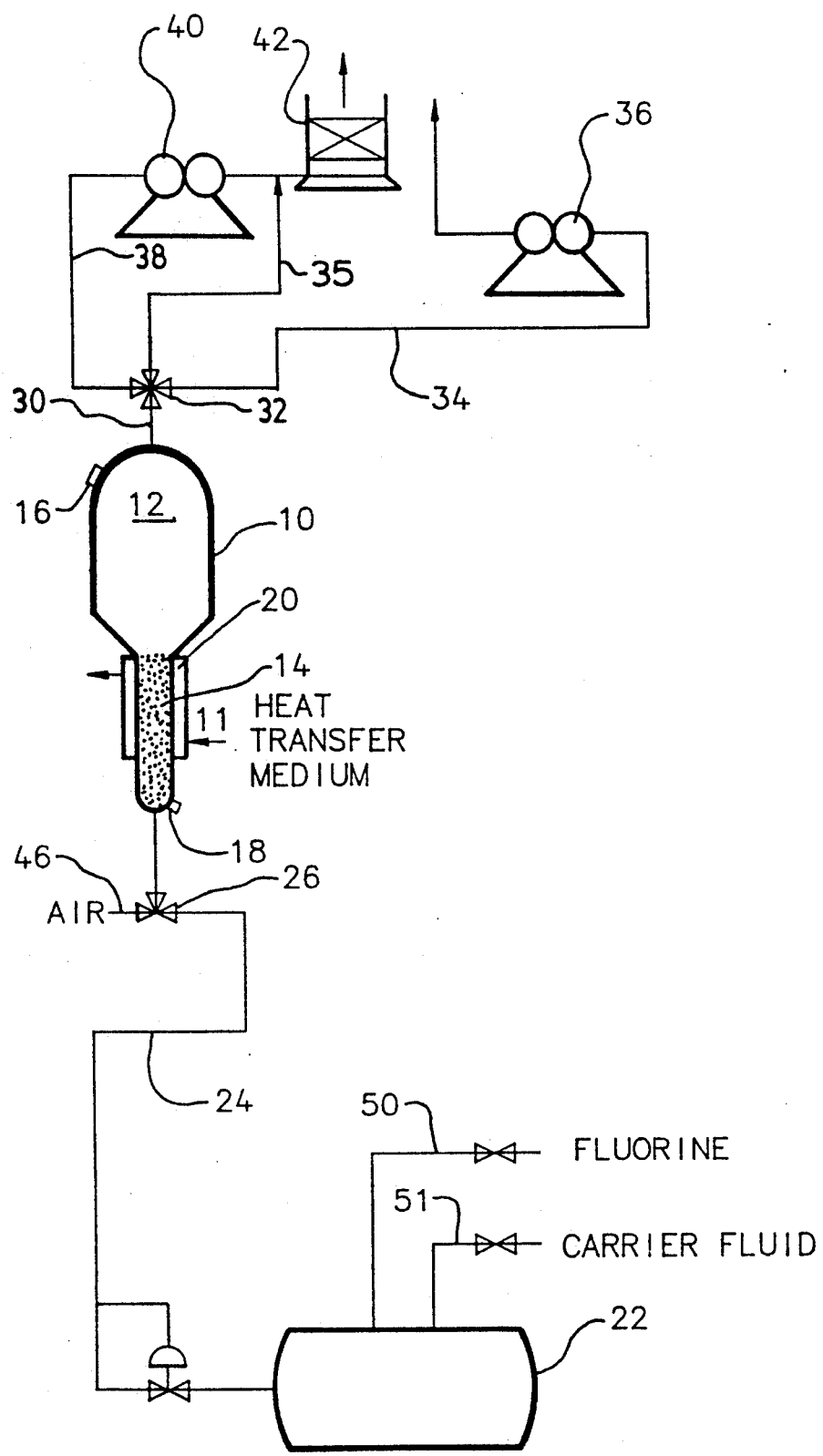
FIG. 1 is a schematic illustration of a batch reactor of the invention.

With reference now to FIG. 1, solid polymeric resin, preferably in the form of a particulate such a powder, pellets or granules, are introduced to reactor 10 through inlet port 16 near the top thereof. Outlet port 18 at the base of reaction zone 14 permits the discharge of the particulate material. A heat exchanger 20 surrounds a substantial portion of the exterior wall of reaction zone 14.

Reactor 10 is a cylindrical pressure vessel having a reaction zone 14 with a height to diameter ratio preferably in the range of 1.5:1 to 5:1 and an upper zone 12 having a height to diameter ratio preferably in the range of 1:1 to 2:1.

Reactor 10 may be fabricated from metals nonreactive with fluorine at the temperature of reaction such as iron, steel, stainless steel, aluminum, copper, brass or the like. Gaskets may be formed from fluorinated rubber or plastic.

Gaseous fluorine and a carrier fluid in accordance with the invention are fed to a mixing tank 22 preparatory to being fed to tower reactor 10 through line 24 and valve 26.

The upper end 12 of tower reactor 10 has outlet 30 with three-way discharge valve 32 having line 34 to evacuating pump 36 and flow lines 35 and 38 from valve 32 to scrubber 42 for reasons which will become evident as the description proceeds.

In operation, reactor 10 is charged with the solid particulate material to be fluorinated through inlet port 16 which is then closed to the atmosphere. Valve 32 is opened to line 34 and to evacuating pump 36 which exhausts air from tower reactor 10 until reaction zones 12, 14 are under the desired vacuum, at which time valve 32 is closed to line 34 and the fluorine carrier fluid mixture is introduced to the reactor through line 24 and valve 26 for direct contact of the fluorine mixture with the solid polymeric resin particles. When the pressure in the reactor reaches about one atmosphere (770 torr), valve 32 is opened to line 35 to pass reaction vapours and gases from tower reactor 10 through scrubber 42 before discharge to the atmosphere. The term "fluidize" used herein in the specification and claims will be understood to include agitation of the solid particles.

A continuous fluid flow from supply mixing tank 22 to the reactor 10 is maintained to fluidize or at least agitate the particles to maintain them in continuous motion for effective and uniform reaction and heat removal and to prevent agglomeration of the heated particles.

A desired dwell time of the polymeric resin particulate in the fluorinating atmosphere is provided, mixing tank 22 continuously being replenished with gaseous fluorine and carrier fluid by lines 50, 51 respectively. An exhaust time of 10 minutes and reaction dwell time of 60 minutes have been found adequate.

Upon completion of the reaction within reactor 10, valve 26 and valve 32 to line 35 are closed and toxic reaction products in the form of carrier fluid mixture and by-product gases are removed from the reactor through valve 32 to line 38 to discharge pump 40 and scrubber 42.

Once reactor 10 is free of toxic reaction products, valve 26 is opened to the atmosphere for the ingress of air through line 46. The fluorinated resin is then discharged through outlet 18.

The desired reaction temperature is maintained constant throughout the reaction by the circulation of a heat transfer medium 11, such as cooling water, through heat exchange jacket 20.

Figure 2:
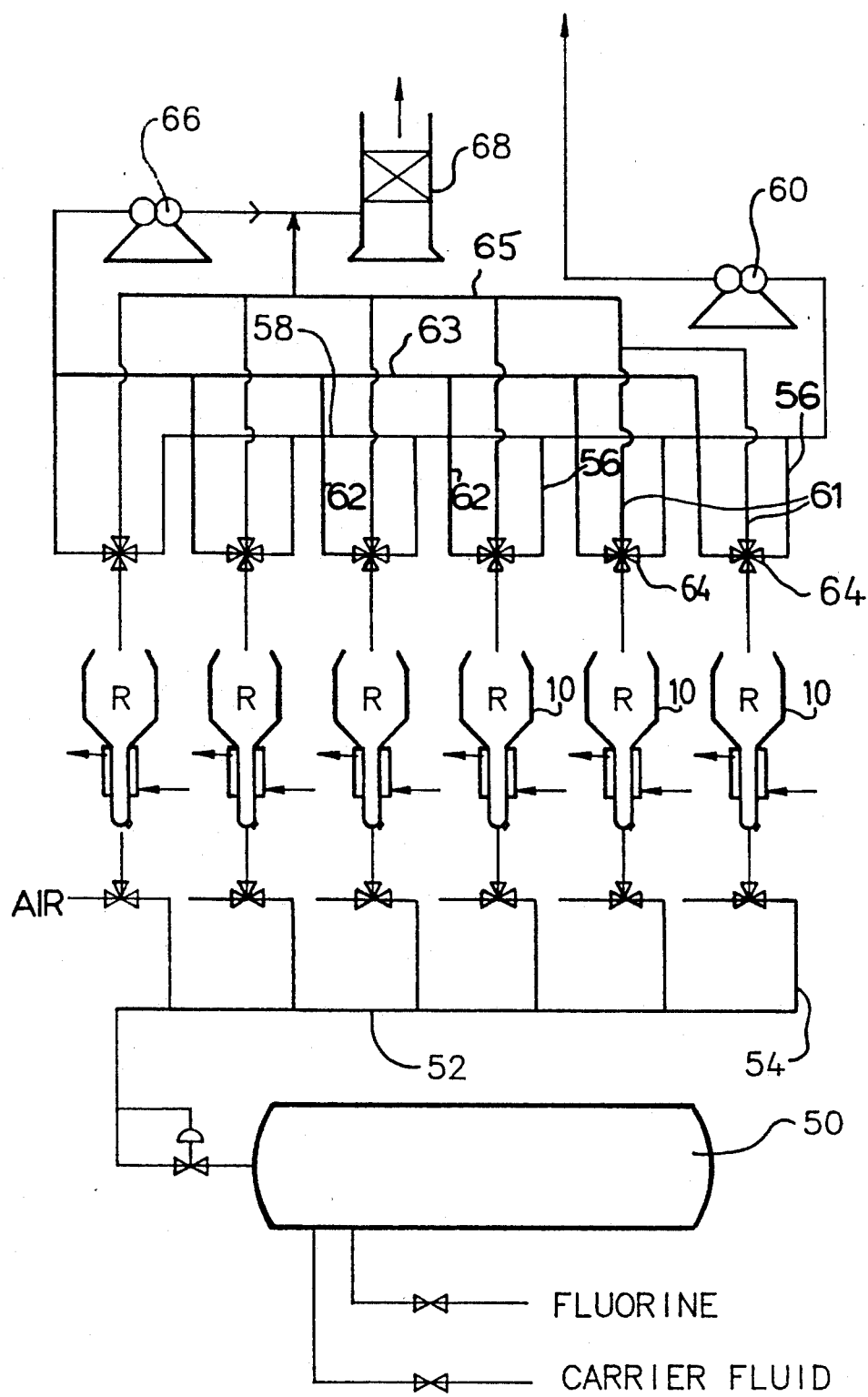
FIG. 2 is a schematic illustration of the batch reactor shown in FIG. 1 arranged in a multireactor continuous mode.

FIG. 2 illustrates a multi-reactor continuous system in which a plurality of tower reactors 10 are arranged in parallel to receive a mixture of fluorine and carrier fluid from mixing tank 50 by way of flow line manifold header 52 supplying feed lines 54. The gases evacuating from tower reactors 10 through three-way valves 64 and discharge lines 56 are collected by discharge manifold header 58 and conducted to evacuation pump 60 for discharge to the atmosphere. The gaseous reaction products are collected from lines 61 by discharge manifold header 65 controlled by three-way valves 64 and conducted to scrubber 68 before discharge to the atmosphere. Residual toxic fluids are removed from the reactors through valves 64 to lines 63 and de-gasing pump 66 and scrubber 68.

The operation of the tower reactors shown in FIG. 2 is the same as that of the single tower reactor described with reference to FIG. 1, the operation of the tower reactions being staggered in order to allow a continuous mode of operation.

Figure 3:
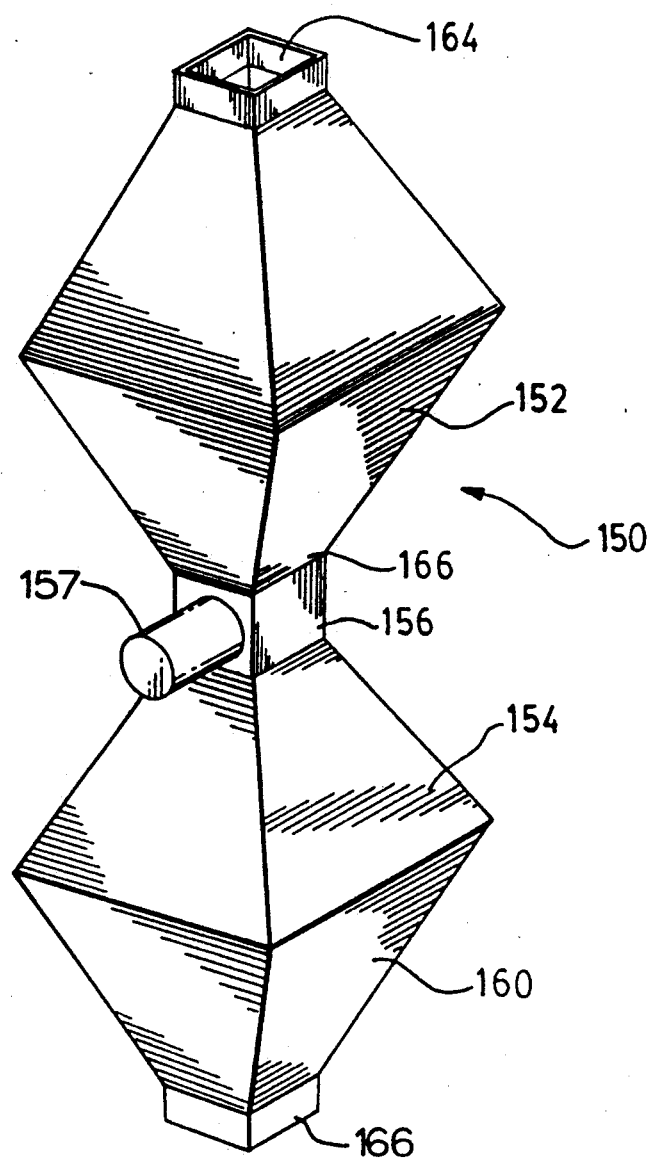
FIG. 3 is a perspective view of a pair of cages of a multi-cage reactor.

FIG. 3 illustrates a multi-reactor 150 in which a pair of hollow gas-tight vessels 152,154 are disposed one above the other and interconnected by a feeder valve 156 having a variable speed drive motor 157 for regulating the rate of feed from the upper vessel 152 to the lower vessel 154. Vessels 152, 154 can form a pair of vessels in a multi-reactor system comprising up to ten or more vessels arranged in series with a feeder valve 156 disposed between each adjacent pair of vessels.

A solid polymeric particulate descends from the upper vessel to the lower vessel preferably counter-current to a rising flow of fluid reactant consisting of fluorine and dense carrier fluid of the invention. The rising fluid effectively fluidizes or at least agitates the solid particles in the vessels to maintain the particles in continuous motion.

The heat of reaction may affect the temperature in the reactor with temperature elevation normally causing an increase in the pressure in the closed vessels. The provision of an external heat transfer jacket 160, containing a heat transfer medium such as water or oil, maintains the temperature relatively constant in each vessel independent of the rate of reaction. The multi-vessel reactors can operate at the same temperature or at different temperatures when a temperature profile from the bottom to the top vessel of the reactor is desired. The temperature is regulated by controlling the flow rate of the transfer medium to produce the desired temperature profile from vessel to vessel.

Each vessel, such as typified by vessel 152, is a sealed chamber with an inlet 164 and an outlet 166 for the solid particulate polymeric resins. Inlet 164 and outlet 166 for the solid particulate are the outlet and inlet respectively for the rising counter-current flow of mixture of fluorine and carrier fluid, preferably dense carrier fluid.

The double-cone inverted shape shown in FIG. 3 is understood to be typical only of a vessel operative for the process of the invention and shapes such as cylindrical, spherical, cubical, and trapezoidal are contemplated for a vessel unit. It is desired that the vessel configuration allows facile solids flow, continuous and uniform motion of the solid particles, and sufficient heat transfer surface area to control the reaction temperature. The bottom cone of the vessel, which preferably has a slope greater than the angle of repose of the solid particulate material, has heat transfer jacket 160 for the circulation of the heat transfer medium to maintain the interior of the vessel at a desired process temperature.

Figure 4:
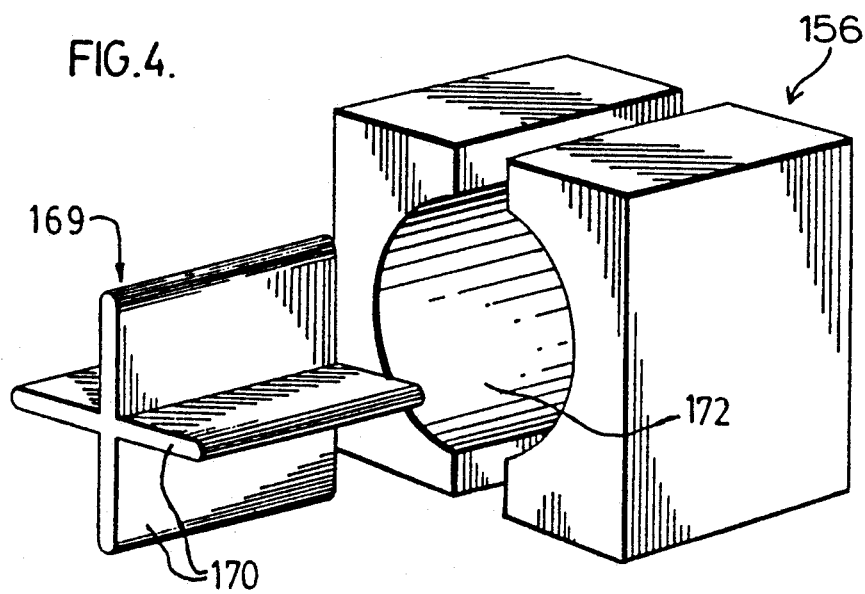
FIG. 4 is an enlarged exploded perspective view of the rotating-valve control shown in FIG. 3.

The rotating vane feed regulator 156 shown generally in FIG. 3 is shown in more detail in the exploded perspective view of FIG. 4. Rotor 169 having a plurality of radial vanes 170 is adapted to rotate at a speed controlled by variable speed motor 157 (FIG. 3) within chamber 172 defined between the adjacent vessels.

Figure 5:
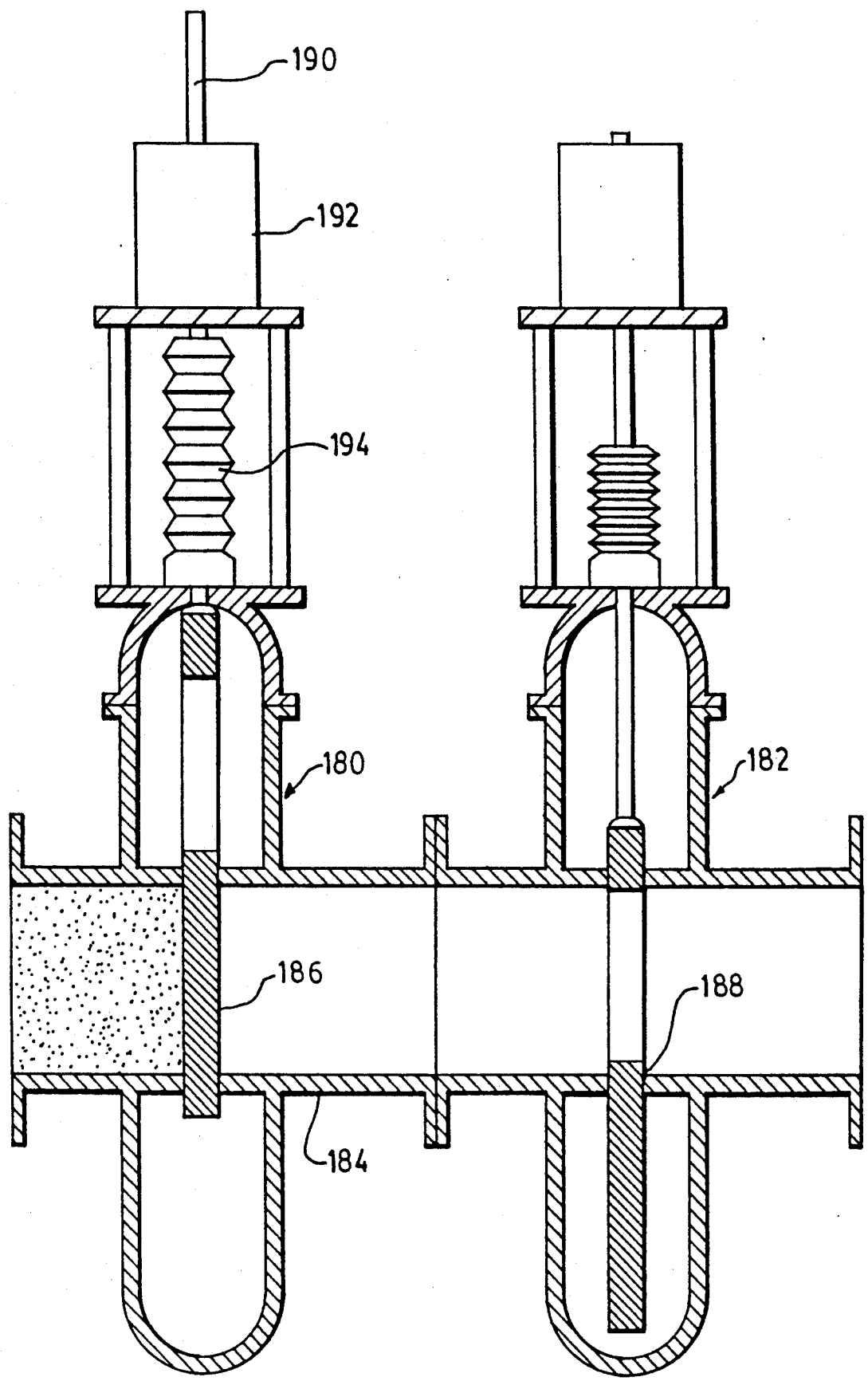
FIGS. 5–7 are longitudinal sections of double gate feeders in series showing controlled feeding of reaction materials to a cage of a multi-cage reactor.
Figure 6:
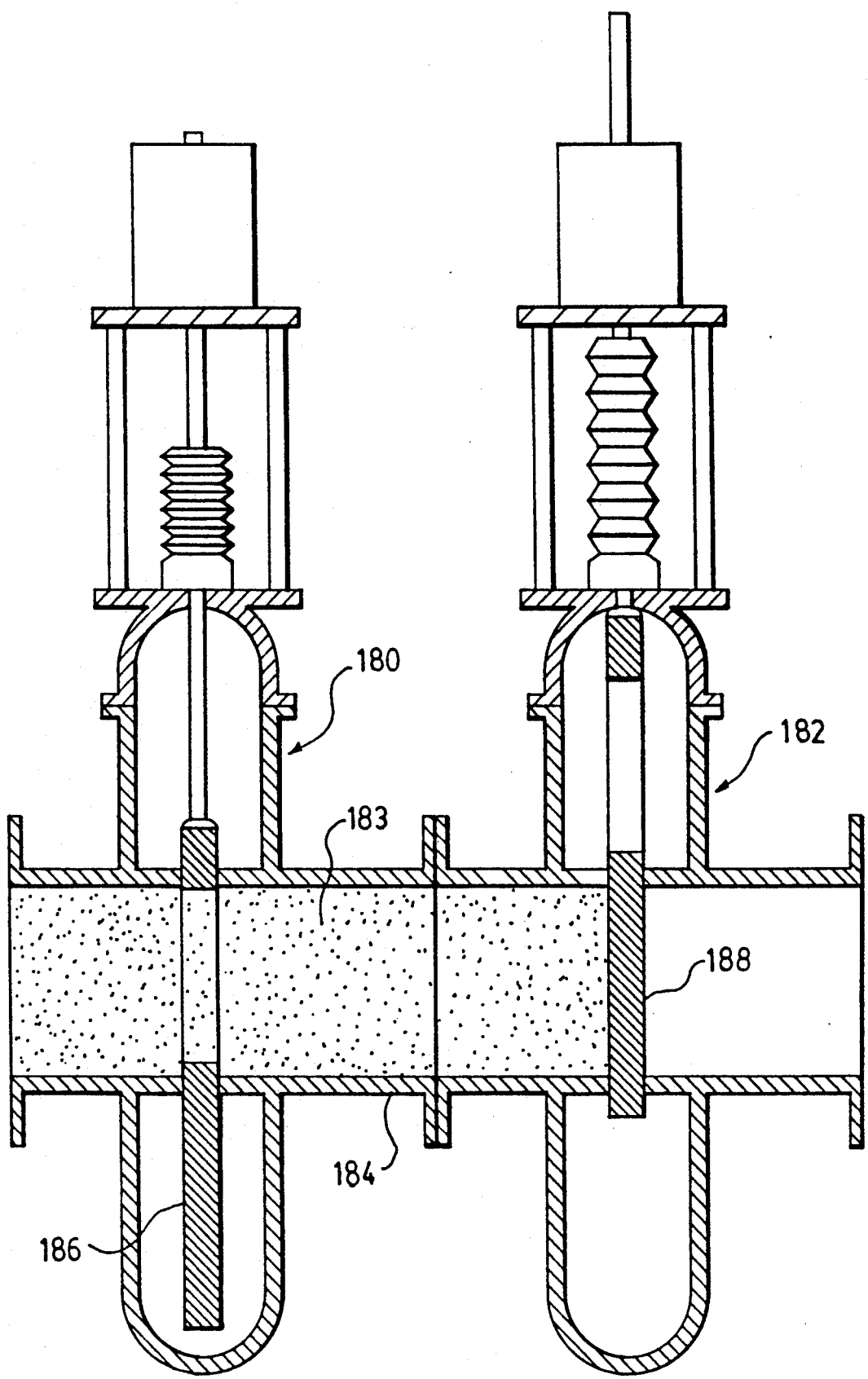
Figure 7:
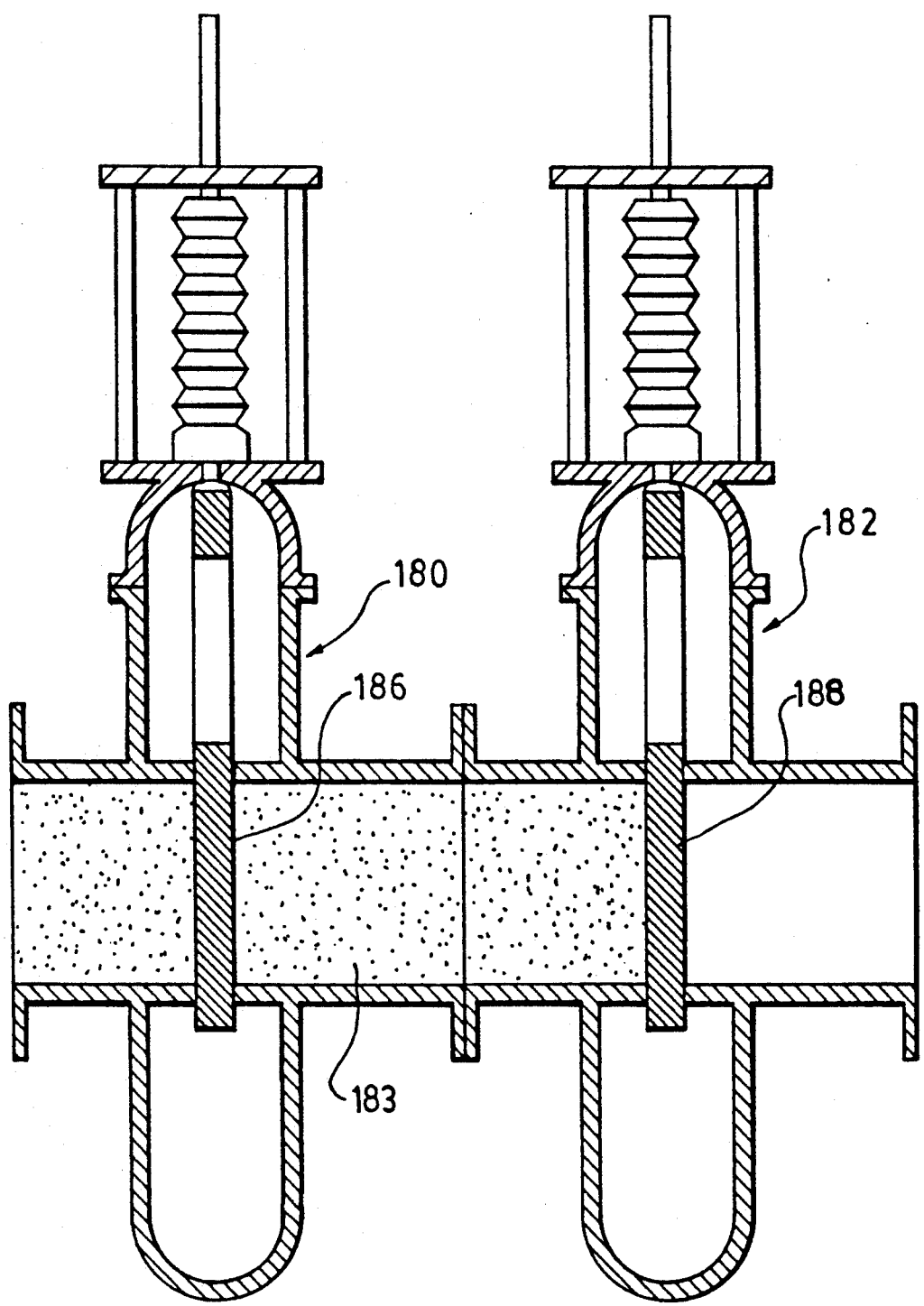

FIGS. 5, 6 and 7 illustrate an embodiment of double gate feeder interposed between adjacent vessels for regulating the quantity of flow of solid particulates between said vessels. With reference to FIG. 5, a pair of gate assemblies 180, 182 are spaced apart axially one above the other in a conduit 184 joining adjacent vessels, not shown. Each of gate 186, 188 is actuated by a rod 190 mounted for axial movement within solenoid 192 with a bellows seal 194 to provide an effective vapour lock preventing the escape of toxic gaseous fluids and the entry of air.

The sequence of steps for feeding a particulate and/or gaseous material past the double gate is illustrated in FIGS. 5-7, in which:

FIG. 5 shows gate 186 closed and gate 188 open;

FIG. 6 shown gate 186 open and gate 188 closed to allow the particulate resin depicted by numeral 183 to flow to gate assembly 182; and FIG. 7 shows a measured volume of resin 183 between gates 186, 188 prior to opening of gate assembly 182 to allow the resin to fall into the next lower vessel.

The process of the invention will now be described with reference to the following non-limitative examples in which polyethylene resin having an average particle size of about 200 microns and a bulk density of 0.61 g/cc was reacted with elemental fluorine and a dense carrier fluid in a tower reactor of the type shown in FIG. 1. The reactor had an internal volume of about 35 liters with a lower reaction zone of 15 cm diameter, a height of 80 cm, and an upper contiguous phase separation zone of 25 cm diameter and a height of 40 cm. A supply tank had an internal volume of 200 liters and a working pressure of about 3300 torr.

EXAMPLE 1

The reactor was charged with 5 kg of polyethylene resin, evacuated and the fluorination process conducted at room temperature. The reaction dwell time was 60 minutes and the pressure in the reactor was maintained at 800 torr. The fluorine in a carrier fluid of carbon dioxide was flowed through at a flow rate of 11 liters/minute (L/M). Fluorine concentration in the carrier fluid was 5% by volume. The initial pressure in the supply tank was 3200 torr. After fluorination was completed, no apparent changes in agglomeration, colour or bulk density were observed in the solid particles. The fluorine incorporated was about 0.5% by weight.

EXAMPLE 2

The conditions were the same as in Example 1 except for a reduced charge of 2.5 kg of polyethylene resin. No agglomeration, colour change or bulk density change was observed. The fluorine incorporated was about 1.0% by weight.

EXAMPLE 3

The conditions were the same as in Example 1 but with an increased charge of 10 kg of polyethylene resin. No agglomeration, colour change or bulk density change was observed. Fluorine was incorporated in the solid resin at about 0.25% by weight.

It will be understood of course that other embodiments and examples of the invention will be clearly apparent to a person skilled in the art, the scope and purview of the invention being defined in the appended claims.

I claim:

1. An apparatus for fluorinating particulate polymeric materials capable of being fluorinated, said apparatus comprising a closed reactor vessel having a lower end and an upper end, said lower end of the reactor vessel having a height to diameter ratio in the range of 1.5:1 to 5:1 and the upper end of the reactor vessel having a height to diameter ratio in the range of 1:1 to 2:1, a heat exchanger jacketing said lower end of the reactor for controlling the temperature within the reactor vessel, feeder valve means for feeding said particulate polymeric material to the reactor vessel at the upper end thereof, an outlet formed in the upper end of the reactor vessel having valving means in communication with an evacuating pump for selectively exhausting gases from the reactor vessel, a closed mixing tank, a source of fluorine, a source of carrier fluid, feeding means for directing the fluorine and the carrier fluid from their respective sources to the closed mixing tank, said carrier fluid selected from the group consisting of helium, nitrogen, argon, and a dense carrier fluid having a critical temperature higher than ambient temperature, a boiling point lower than ambient temperature minus 60 celsius degrees, and a molecular weight greater than the molecular weight of elemental fluorine to the lower end of the reactor vessel for agitating or fluidizing the particulate polymeric material and for reaction with said polymeric material, the reactor vessel being fabricated form a material nonreactive with fluorine at the temperature of reaction, said closed mixing tank containing a mixture of fluorine and carrier fluid preparatory to feeding said mixture of fluorine and carrier fluid to the reactor vessel, valve means at the base of the lower end of the reactor vessel for the selective ingress if air and the mixture of fluorine and carrier fluid to the reactor vessel, and an outlet port at the base of the lower end of the reactor vessel for the discharge of fluorinated resin from the reactor vessel.

2. An apparatus as claimed in claim 1 comprising a plurality of said reactor vessels in parallel, each of said reactor vessels having a cylindrical shape, manifold means for selectively feeding a particulate polymeric material to a reactor vessel at the upper end thereof and for feeding said mixture of fluorine and carrier fluid to the lower end of said reactor vessel, and manifold means for controllably removing fluids from said reactor vessel.

3. An apparatus as claimed in claim 1 in which said reactor vessel comprises at least a pair of hollow gastight vessels disposed one above the other and interconnected by a feeder valve for regulating the rate of feed of polymeric material in particulate form from the upper vessel to the lower vessel and for permitting the upward flow of mixture of fluorine and carrier fluid counter-current to the downward flow of the polymeric material for fluidizing the polymeric material within the vessels.

4. An apparatus as claimed in claim 2 in which said reactor vessel comprises at least a pair of hollow gastight vessels disposed one above the other and interconnected by a feeder valve for regulating the rate of feed of polymeric material in particulate form from the upper vessel to the lower vessel and for permitting the upward flow of mixture of fluorine and carrier fluid counter-current to the downward flow of the polymeric material for fluidizing the polymeric material within the vessels.

5. An apparatus as claimed in claim 4 in which each said vessel has an external heat transfer jacket for controlling the temperature within the said vessel.

6. An apparatus as claimed in claim 5 in which each said vessel has a side wall with a slope greater than the angle of repose of the solid particulate material.

7. An apparatus as claimed in claim 3 in which said feeder valve is a rotating vane feed regulator.

8. An apparatus as claimed in claim 3 in which said feeder valve is a double gate feeder.

9. An apparatus as claimed in claim 4 in which said feeder valve is a rotating vane feed regulator.

10. An apparatus as claimed in claim 4 in which said feeder valve is a double gate feeder.

* * * * *